Aug. 4, 1964
H. C. FLINT
3,143,339
CUSHION CONSTRUCTION AND SPRINGS THEREFOR
Filed Aug. 17, 1961
3 Sheets-Sheet 3
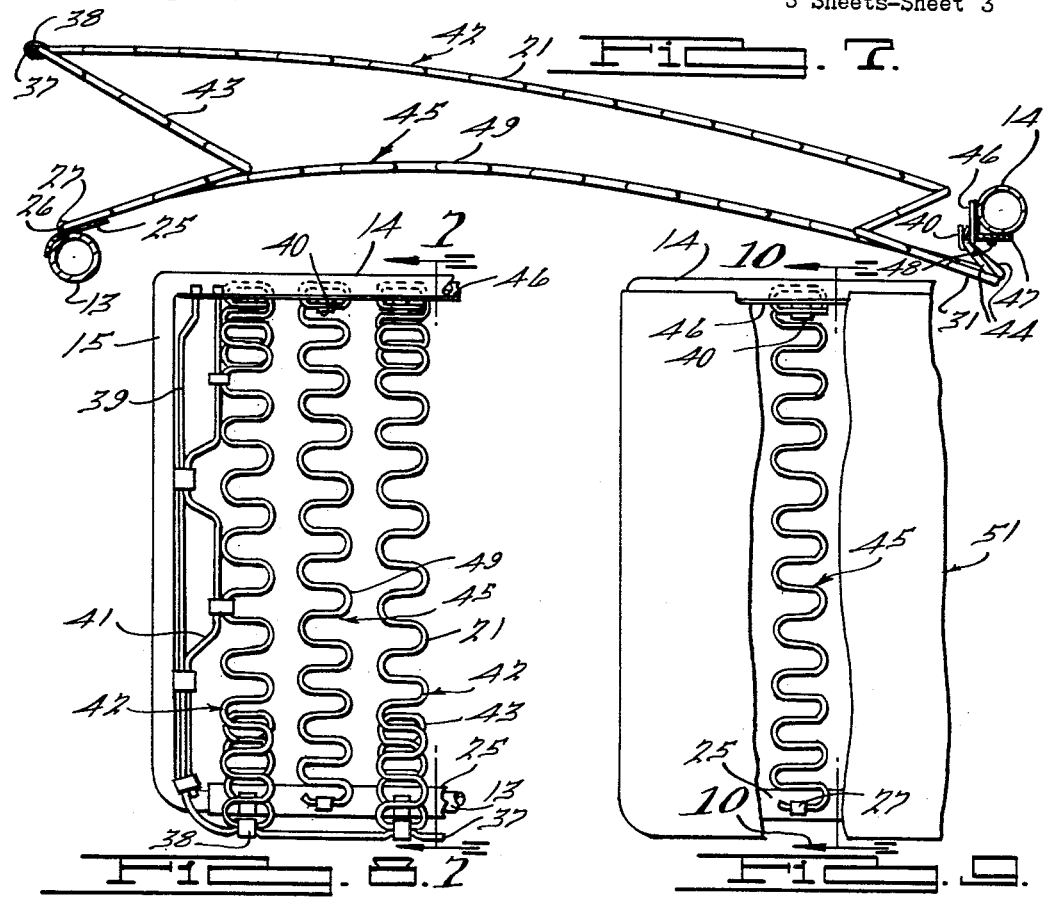
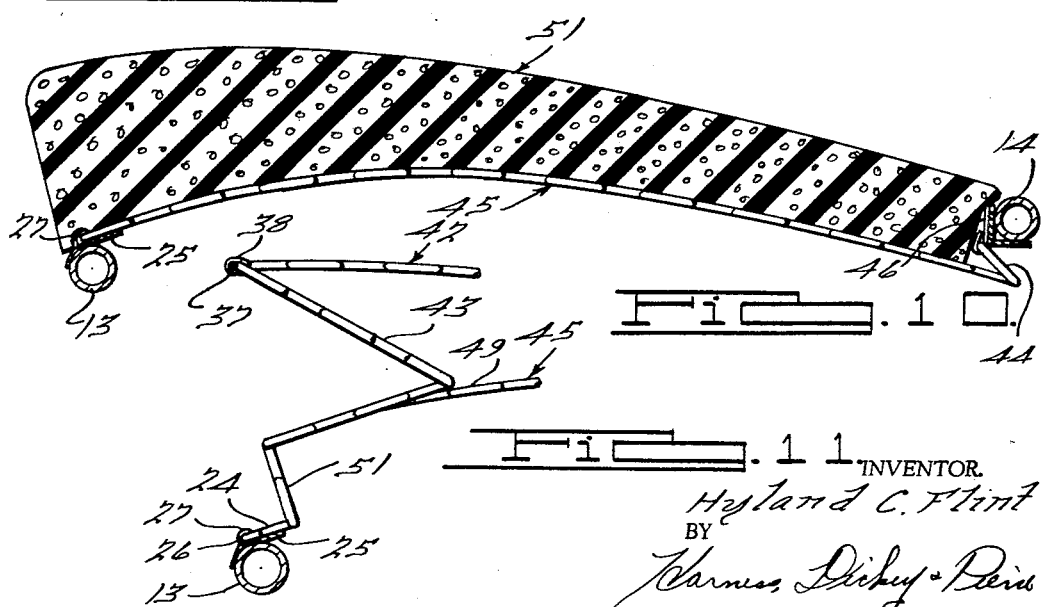
INVENTOR.
Hyland C. Flint
BY
Harness, Dickey & Pierce
ATTORNEYS United States Patent Office 3,143,339
Patented Aug. 4, 1964

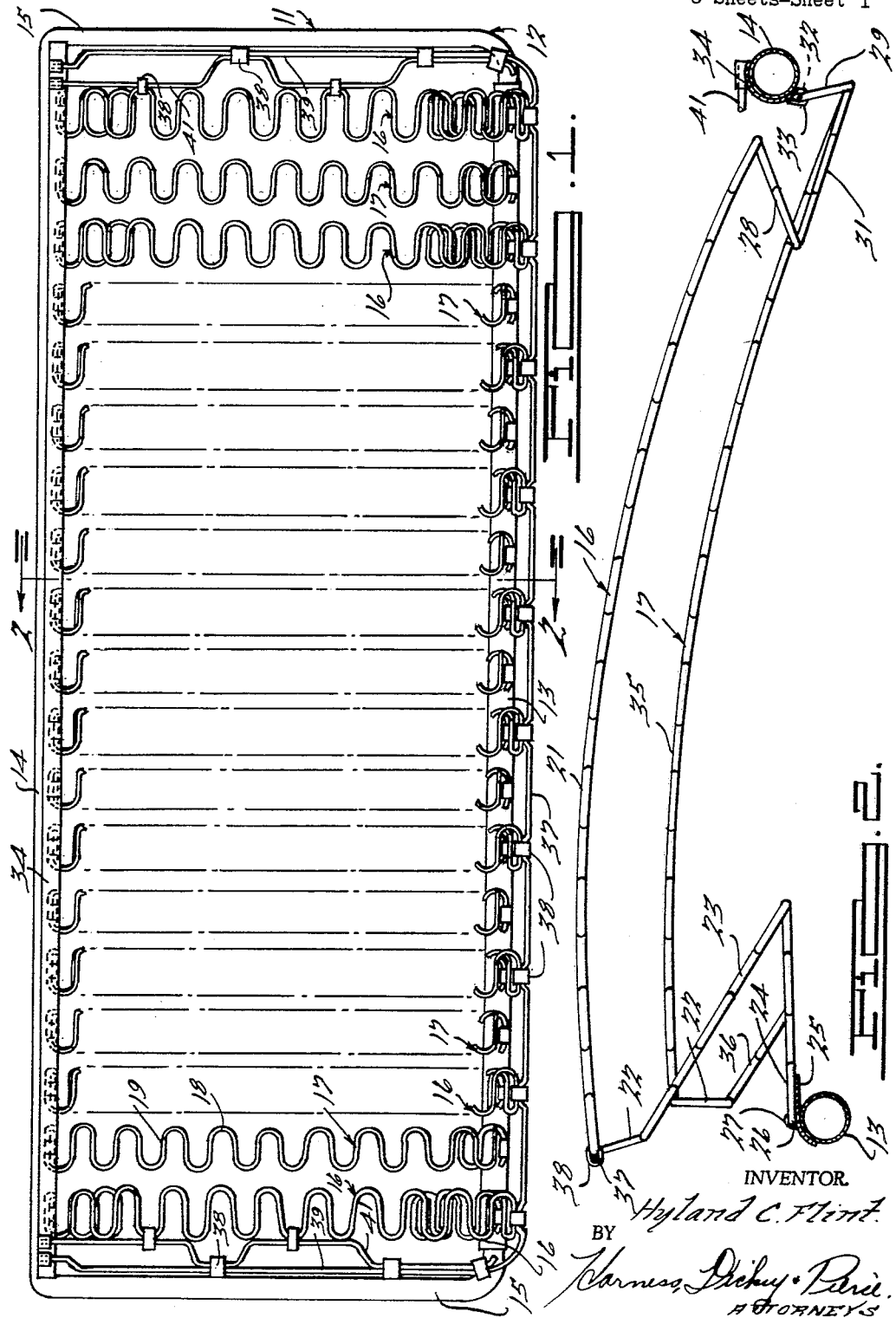

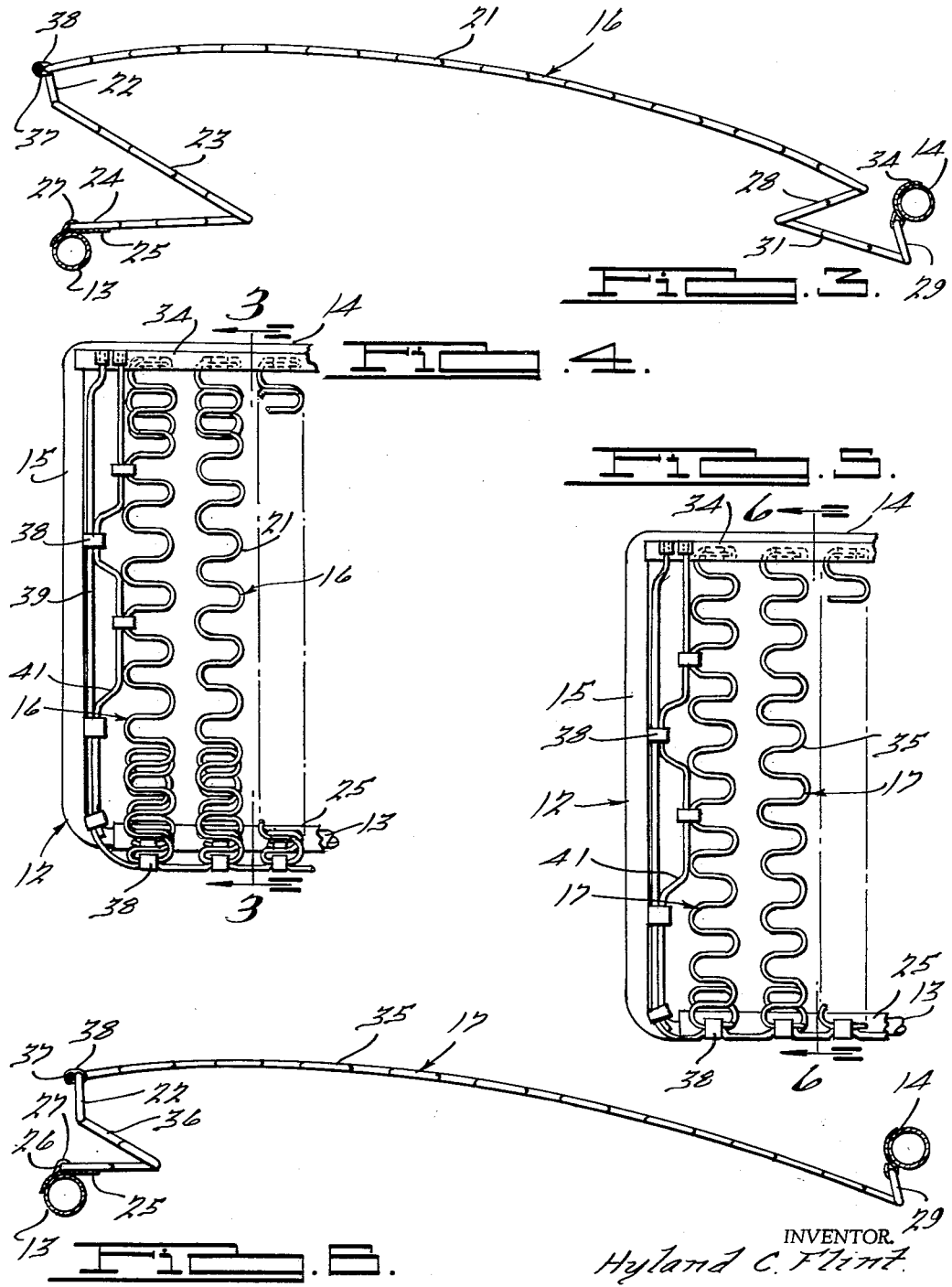

3,143,339
CUSHION CONSTRUCTION AND SPRINGS THEREFOR
Hyland C. Flint, Orchard Lake, Mich., assignor to American Metal Products Company, Detroit, Mich., a corporation of Michigan
Filed Aug. 17, 1961, Ser. No. 132,227
10 Claims. (Cl. 267—107)

This invention relates to springs and spring cushion constructions, and particularly to a spring and a cushion construction which has incorporated therein resistance against downward deflection of the load bearing area thereof.

The sinuous type of spring strip formed of wire bent back and forth to have uniform loops oppositely disposed and joined by straight portions was limited in its application. Difficulty was experienced when mounting the spring strip in a manner to have the load bearing area thereof between the supporting ends assume a proper contour when loaded, one which eliminated undue pressure on the occupant by the rear edge of the cushion. While some success was had when the strips were provided with V-shaped ends, addtional elements in the nature of brace rods added reinforcing sections, or soft edge members were necessary to provide comfort to the seating area. The addition of these elements increased the cost of the resulting spring cushion and often the overstressing of certain points of the spring strips resulted in fatigue and ultimate failure. A later type of spring strip was developed, known as the "formed wire" spring strip which had rectangular loops, with the connecting bars spaced different amounts apart to provide varying weakness which was relied upon to produce the proper contouring to the load bearing area when occupied. To withstand severe usage, brace rods or other elements were employed with the spring strips which, as pointed out above, added cost to the resulting cushion.

The present invention pertains to a spring strip of the uniform or nonuniform loop type having a downwardly and rearwardly sloping loop at the rear end which swings upwardly when the load bearing area of the spring strip is loaded, to thereby absorb an increasing amount of force and provide increasing resistance to the deflection produced by the load. The spring strips may be of like construction secured across the seat frame from the front to the rear thereof, or some of the spring strips may be of greater height than other of the spring strips which are disposed therebetween. The lower spring strips become effective for supporting the load after the higher spring strips have absorbed a considerable amount of the load by being deflected downwardly into the plane thereof. The downwardly and rearwardly sloping loop at the end of the spring strip is free swinging so as to eliminate any overstressing of the loop or portions adjacent thereto so that no part of the spring strip will be overfatigued and subjected to failure.

Accordingly, the main objects of the invention are: to provide a spring strip for a cushion having an end loop sloping upwardly and forwardly at the rear end thereof; to provide a spring strip with front and rear end supporting portions which are joined by a load bearing section therebetween, with the rear end supporting portion having its endmost rear loop bent upwardly and forwardly to be at an acute angle to the adjacent end of the rear supporting portion; to form a seat cushion from a plurality of spring strips having the rear end loops extending upwardly and forwardly at an acute angle to the adjacent portion of the strips with the spring strips of the same configuration or with alternate springs of less height, and, in, in general, to provide a spring strip and a cushion formed therefrom which is simple in construction, which has increasing resistance against increasing deflection under load, and which is economical of manufacture.

Other objects and features of novelty of the invention will be specifically pointed out or will become apparent when referring, for a better understanding of the invention, to the following description taken in conjunction with the accompanying drawings, wherein:

FIGURE 1 is a plan view of a seat cushion having spring strips thereon, embodying features of the present invention;

FIG. 2 is an enlarged sectional view of the structure illustrated in FIG. 1, taken on the line 2—2 thereof;

FIG. 3 is an enlarged sectional view of the structure illustrated in FIG. 4, taken on the line 3—3 thereof;

FIG. 4 is a broken sectional view of a seat cushion, similar to that illustrated in FIG. 1, showing another form thereof;

FIG. 5 is a view of structure, similar to that illustrated in FIG. 4, showing a further form of the invention;

FIG. 6 is an enlarged sectional view of the structure illustrated in FIG. 5, taken on the line 6—6 thereof;

FIG. 7 is a view of structure, similar to that illustrated in FIG. 2, showing a further form of the invention;

FIG. 8 is a plan view of a cushion containing the spring strip illustrated in FIG. 7;

FIG. 9 is a view of structure, similar to that illustrated in FIG. 8, showing a further form of the invention;

FIG. 10 is an enlarged sectional view of the structure illustrated in FIG. 9, taken on the line 10—10 thereof, and FIG. 11 is a broken view of structure, similar to that illustrated in FIG. 7, showing another form of the invention.

In FIGS. 1 and 2, a seat cushion 11 is illustrated having a frame 12 containing a front frame member 13, a rear frame member 14, and side frame members 15. High spring strips 16 are mounted at the ends of the frame elements 13 and 14 and are alternately disposed, with low spring strips 17 disposed therebetween across the entire frame from the side frame member 15 thereof. As herein illustrated, the spring strips are made of wire bent back and forth to provide oppositely facing, alternately disposed, uniform loops 18 joined by straight portions 19. It is to be understood that spring strips of the "formed wire" type, that is to say, those having rectangular loops 18 of different width, could be substituted for the spring strips herein illustrated.

As illustrated in FIG. 2, the spring strips have a load bearing section 21 containing at the front end a downwardly extending loop 22 and a V-shaped supporting portion 23 having an end loop 24 resting on a flange 25, with the transverse end 26 disposed within a laterally disposed channel 27. The channel and the flange 25 form a part of a stamping which is welded or otherwise secured to the front tubular frame member 13. The load bearing section 21 at the rear end has a V-shaped supporting portion 28, with an endmost loop 29 thereof bent upwardly and forwardly to be disposed at an acute angle to the rear bottom end portion 31 of the strip. The transverse end section 32 of the end loop 29 is secured in a U-shaped clip 33, a plurality of which extend from a strip 34 which is welded or otherwise secured to the rear tubular frame element 14.

The spring strips 17 have a load bearing section 35 containing at the front end a downwardly extending loop 22 and a V-shaped front end portion 36. The portion 36 has an end loop 24 containing a transverse end section 26 which is disposed within a channel 27 in the stamping attached to the front frame member 13. The rear end of the strip 17 has a loop 29 the same as the loop 29 of the spring strip 16 which forms an acute angle with the rear end of the load bearing section 35 and which has a transverse end section 32 secured in a closed loop 33 of the strip 34.

After the spring strips 16 and 17 have been assembled alternately across the frame 12, a border wire 37 is secured to the forward straight portion of the load bearing section 21 of the spring strips 16 by clips 38, the border wire having offset portions to which the clips 38 are secured. The border wire has side portions 39, the ends of which extend into slots in the strip 34. A wire filler element 41 is secured by clips 38 to the side border wire portions 39 and to certain of the loops of the endmost spring strips 16. In this arrangement, the forward ends of the lower spring strips 17 are not connected in any manner to each other, the spring strips 16 or the border wire 37.

When a load is applied to the cushion after it is trimmed, the spring strips 16 will first be deflected and after supporting a substantial load which causes the spring strip to deflect to and beyond spring strips 17, the latter spring strips will pick up the load and assist in its support. As load is applied to either of the spring strips, the loops 29 which slope rearwardly from the supporting loops 33 will be forced to swing upwardly. The amount of the upward swing will depend upon the amount of the load applied to the load bearing sections 21 and 35 of the spring strips. The farther the loops 29 are forced to swing upwardly, the greater will be the resistance they will produce against the downward deflection of the load bearing section. This will stabilize the spring strips and permit the load bearing area thereof to assume a flat S-shaped contour which is desirable to provide softness and comfort to the resulting load bearing area of the cushion. The springs are self-sustaining, requiring no auxiliary elements for bracing and reinforcing the spring strips since the force required to swing the end loops 29 upwardly provides stability to the spring strips throughout the load bearing sections thereof.

In FIGS. 3 and 4, a further form of the invention is illustrated, that wherein the spring strips 16 are employed at the ends and throughout the entire area of the frame. All of the load bearing section 21 of the frame assumes the immediate support of the load applied thereto, the deflection of which is resisted by the upward swinging movement of the end loop 29 thereof.

In FIGS. 5 and 6, a still further form of the invention is illustrated, that wherein the spring strips 17 are employed as the endmost spring strips and those therebetween across the entire width of the frame 12. All of the load bearing sections 35 of the cushion are in aligned adjacent relationship so that all of the spring strips will share the load when a load is applied to the cushion. The contouring and the deflection of the load bearing section 35 is controlled by the upward swinging of the end loops 29 pivoted on the rear frame member 14.

In FIGS. 7 and 8, a still further form of the invention is illustrated, that wherein a spring strip 42 is similar to the spring strip 16, with a forward V-supporting end portion 43 provided at the front having the endmost transverse end 26 secured in a channel 27, with the adjacent loop resting upon the flange 25. The endmost loop 44 secured in a clip 40 of a strip 46 has a greater acute angle to the end portion 31 of the spring to offer greater resistance to upward deflection when the main load bearing section 21 is loaded. The spring strips 42 take the place of the spring strips 16 in the structure illustrated in FIG. 1, and the spring strips 45 are employed as the alternate strips in place of the strips 17 illustrated in the cushion assembly of FIG. 1. The spring strips 42 have an end loop 44 thereon secured in the clips 40 of the strip 46. The strip 46 is welded to an angular strip 47 which is secured to the rear frame element 14. Teeth 48 are provided on the angle element 47 to which the upholstery material of the cushion is secured. The load bearing portion 49 of the spring strip 45 extends outwardly parallel to the load bearing section 42 to the center of the spring, and then arches downwardly to have the endmost loop secured in a channel 27 when resting upon the flange 25. The spring 45 is employed to take up the load after the spring 42 has deflected into parallel relation therewith under the load applied to the cushion. The downward deflection of the load bearing sections 21 and 49 of the spring strips 42 and 45 is increasingly resisted by the upwardly swinging end loops 44 in direct proportion to the deflection. As the deflection increases, a greater force is required to swing the loops upwardly, and when the load is stabilized any movement thereof will flutter the loops to counter the change in deflection caused thereby.

In FIGS. 9 and 10, a still further form of the invention is illustrated, that wherein the spring 45 is employed alone across the front 12, supported thereon in a manner above described. The endmost loops 44 retain the sharp acute angle relation to the load bearing portion 49 of the spring strip, as is clearly illustrated in the figure. A contoured foam rubber pad 51 is applied to the top of the plurality of springs 45 to produce additional softness and contouring to the resulting seat. An extremely low cushion is constructed in this manner, such as that for a bucket seat for a compact car which is disposed close to the floor of the vehicle body.

It is to be understood that for all the spring cushion constructions herein illustrated, insulators, pads and trim material are employed thereover for finishing the cushion in a manner well known in the art. In all of the cushions herein illustrated, the brace rod and other separate elements heretofore applied to such spring strips are eliminated by the use of the acute angled end portion which may contain one or more loops, depending upon the type of spring, the gauge of the wire, and the load to be supported. The loops are pivotally supported within clips in a manner to have them free to swing upwardly to at least a horizontal position without striking a stop element. When high and low springs are employed, as illustrated in FIGS. 1, 2, 7 and 8, it is to be understood that different gauge wire may be employed on the respective springs. Since the wire strip has resistance built therein to prevent uncontrolled deflection, the resulting cushion is extremely cheap, simple in assembly, and substantially indestructible.

In FIG. 11, the spring strips 42 and 45 are illustrated as having a vertical portion 51 between the end loop 24 and the adjacent portion of the spring strips. This provides greater height to the front end of the cushion without changing the resiliency thereof.

What is claimed is:

1. In a cushion construction, a frame having front and rear frame members spaced by side members, a plurality of spring strips extending between the frame members, the spring strips being made of wire having downwardly extending front end supporting sections with the ends secured in fixed relation to the front frame member, the rear ends of the spring strips having an upwardly and forwardly extending section disposed at an acute angle to the rear end portion of the spring strip, and means for attaching the upwardly and forwardly extending section of the spring strip in free pivotal relation on the rear frame member, the endmost spring strips and alternate spring strip therebetween being of high construction, with additional spring strips of less height than the first said alternate spring strips disposed therebetween.

2. In a cushion construction, a frame having front and rear frame members spaced by side members, a plurality of spring strips extending between the frame members, the spring strips being made of wire having downwardly extending front end supporting sections with the ends secured in fixed relation to the front frame member, the rear ends of the spring strips having an upwardly and forwardly extending section disposed at an acute angle to the rear end portion of the spring strip, and means for attaching the upwardly and forwardly extending section of the spring strip in free pivotal relation on the rear frame member, the endmost spring strips and alternate strip therebetween being of high construction, with additional spring strips of less height than the first said alternate spring strips disposed therebetween, the front supporting portion of the spring strips being of V shape.

3. In a cushion construction, a frame having front and rear frame members spaced by side members, a plurality of spring strips extending between the frame members, the spring strips being made of wire having downwardly extending front end supporting sections with the ends secured in fixed relation to the front frame member, the rear ends of the spring strips having an upwardly and forwardly extending section disposed at an acute angle to the rear end portion of the spring strip, means for attaching the upwardly and forwardly extending section of the spring strip in free pivotal relation on the rear frame member, the endmost spring strips and alternate spring strip therebetween being of high construction, with additional spring strips of less height than the first said alternate spring strips disposed therebetween, the front supporting portion of the spring strips being of V shape, and a substantially vertical section extending downwardly from said V-shaped portion.

4. In a cushion construction, a frame having front and rear frame members spaced by side members, a plurality of spring strips extending between the frame members, the spring strips being made of wire having downwardly extending front end supporting sections with the ends secured in fixed relation to the front frame member, the rear ends of the spring strips having an upwardly and forwardly extending section disposed at an acute angle to the rear end portion of the spring strip, and means for attaching the upwardly and forwardly extending section of the spring strip in free pivotal relation on the rear frame member, the endmost spring strips and alternate spring strip therebetween being of high construction, with additional spring strips of less height than the first said alternate spring strips disposed therebetween, the front supporting portion of the spring strips being of V shape, the rear supporting portion of the endmost and said like alternate spring strips also having a V-shaped end supporting portion having the upwardly and forwardly extending section thereon.

5. In a cushion construction, a frame having front and rear frame members spaced by side members, a plurality of spring strips extending between the frame members, the spring strips being made of wire having downwardly extending front end supporting sections with the ends secured in fixed relation to the front frame member, the rear ends of the spring strips having an upwardly and forwardly extending section disposed at an acute angle to the rear end portion of the spring strip, means for attaching the upwardly and forwardly extending section of the spring strip in free pivotal relation on the rear frame member, the endmost spring strips and alternate spring strip therebetween being of high construction, with additional spring strips of less height than the first said alternate spring strips disposed therebetween, the endmost spring strips and the like alternate spring strips having V-shaped end portions at the front and rear ends, the alternate spring strips therebetween having a load bearing section which is of arcuate shape.

6. In a cushion construction, a frame having front end rear frame members spaced by side members, a plurality of spring strips extending between the frame members, the spring strips being made of wire having a front supporting end attached to the front frame member, the rear ends of the spring strips having an upwardly and forwardly extending section disposed at an acute angle to the spring strip rear end portion and forms an apex therewith which is rearwardly of the upper end of the section which forms a pivot, and means for attaching said pivot for swinging movement on the rear frame member with the said section sloping downwardly and rearwardly to have the apex disposed rearwardly of the pivot in position to swing rearwardly and upwardly and provide resistance to the rearward movement of the spring strip when the latter is loaded.

7. In a cushion construction, a frame having front and rear frame members spaced by side members, a plurality of spring strips extending between said frame members, at least some of said strips being made of wire bent back and forth to have oppositely disposed loops therein, the endmost loop of said strips being bent back over the adjacent loop in acute angle relation to the rear end portion of the strip, and means for supporting the endmost loop on the rear frame member for upwardly and rearwardly swinging movement to resist the rearward movement of the strip.

8. In a cushion construction, a frame having front and rear frame members spaced by side members, a plurality of spring strips extending between the frame members, at least some of said spring strips having a load bearing section a front supporting section disposed below the front end thereof and an upwardly extending forwardly sloping end loop portion disposed at an acute angle to the rear end portion of a load bearing section, and means for supporting the end loop on the rear frame member for pivotal movement rearwardly and upwardly when the strips are occupied to resist the rearward movement of the load bearing section.

9. In a cushion construction, a frame having front and rear frame members spaced by side members, a plurality of spring strips made of wire having a load-bearing section downward extending V-shaped front end section for supporting the front end of a load bearing section and a downwardly extending V-shaped rear end section for supporting the rear end of a load bearing section, the endmost portion of the V-shaped rear end section having a section bent upwardly and inclined forwardly to be disposed at an acute angle to said endmost portion, and means for pivoting the inclined section on the rear frame member for rearwardly and upwardly swinging movement when the load bearing sections are occupied to resist the rearward movement thereof.

10. In a cushion construction, a frame having front and rear frame members spaced by side members, spring strips spanning said frame members having a load bearing section and a section at the rear end of the load bearing section extending upwardly and forwardly in an acute angle relation to the rear portion of a load bearing section and means for pivoting the rear end section to the rear frame member in a manner to have the section swing rearwardly and upwardly when the load bearing sections are occupied to resist the rearward movement thereof.

References Cited in the file of this patent

UNITED STATES PATENTS

| 2,731,075 | Flint | Jan. 17, 1956 |
| 2,886,311 | Flint | May 12, 1959 |

FOREIGN PATENTS

| 1,093,158 | France | Nov. 17, 1954 |

UNITED STATES PATENT OFFICE
CERTIFICATE OF CORRECTION

Patent No. 3,143,339                      August 4, 1964

Hyland C. Flint

It is hereby certified that error appears in the above numbered patent requiring correction and that the said Letters Patent should read as corrected below.

Column 5, line 1, after "alternate" insert -- spring --.

Signed and sealed this 29th day of December 1964.

(SEAL)
Attest:

ERNEST W. SWIDER                      EDWARD J. BRENNER
Attesting Officer                       Commissioner of Patents